United States Patent [19]

Bedetti et al.

[11] 3,914,396

[45] *Oct. 21, 1975

[54] METHOD FOR OBTAINING TITANIUM DIOXIDE HAVING A CONTROLLED PARTICLE SIZE

[75] Inventors: Gianfranco Bedetti, Milan; Giovanni Pieri; Aldo Ducato, both of Novara, all of Italy; Llewellyn John Held, Palmerton, Pa.

[73] Assignees: Montecatini Edison S.p.A., Milan, Italy; The New Jersey Zinc Company, Bethlehem, Pa.

[ * ] Notice: The portion of the term of this patent subsequent to Apr. 3, 1990, has been disclaimed.

[22] Filed: Dec. 4, 1972

[21] Appl. No.: 312,123

[30] Foreign Application Priority Data
Dec. 10, 1971  Italy ................................. 32207/71

[52] U.S. Cl. .................. 423/613; 23/277; 423/659
[51] Int. Cl.² ....................................... C01G 23/04
[58] Field of Search ........................... 423/613, 659

[56] References Cited

UNITED STATES PATENTS

| | | | |
|---|---|---|---|
| 3,485,584 | 12/1969 | Zirngibl et al. ..................... | 423/613 |
| 3,512,219 | 5/1970 | Stern et al. ...................... | 423/613 X |
| 3,552,920 | 1/1971 | Bedetti .............................. | 423/613 |
| 3,725,526 | 4/1973 | Pieri et al. .......................... | 423/613 |

*Primary Examiner*—Edward Stern
*Attorney, Agent, or Firm*—Hubbell, Cohen and Stiefel

[57] ABSTRACT

Method for producing pigment quality titanium dioxide of controlled particle size by reacting gaseous titanium tetrachloride with an oxygen-containing gas in a reactor having a cylindrical duct, a coaxial cylindrical reaction chamber of diameter greater than the diameter of the duct and spaced below the duct and a frusto-conical divergent duct connecting the cylindrical duct to the reaction chamber, wherein the oxygen-containing gas is introduced through the cylindrical duct and the titanium tetrachloride is introduced into the frusto-conical section of the reactor at a variably selectable location therein.

3 Claims, 6 Drawing Figures

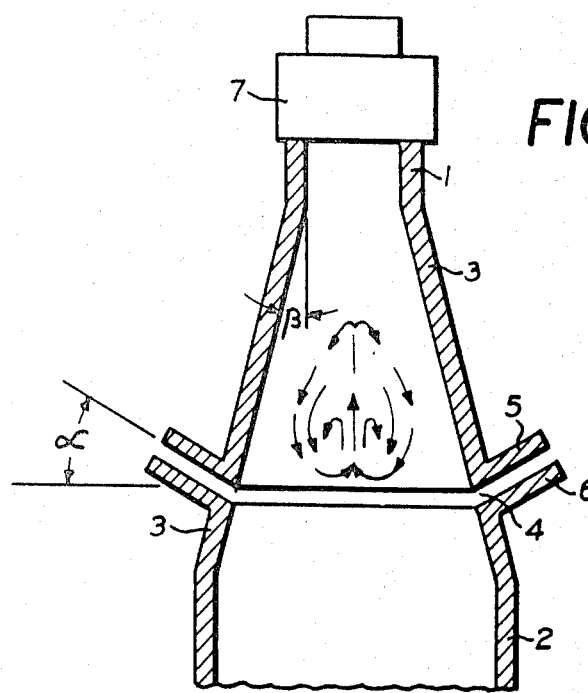
FIG. 3.
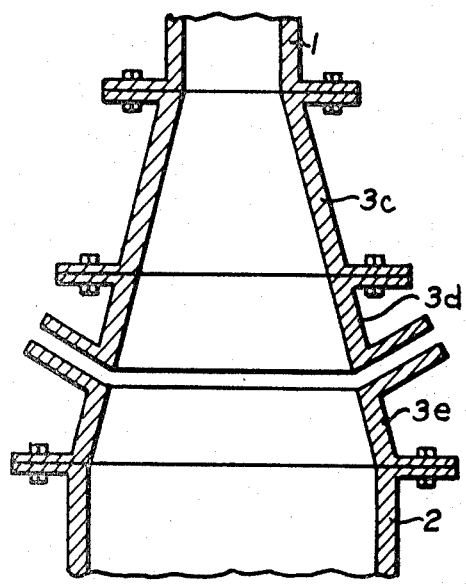
FIG. 4.
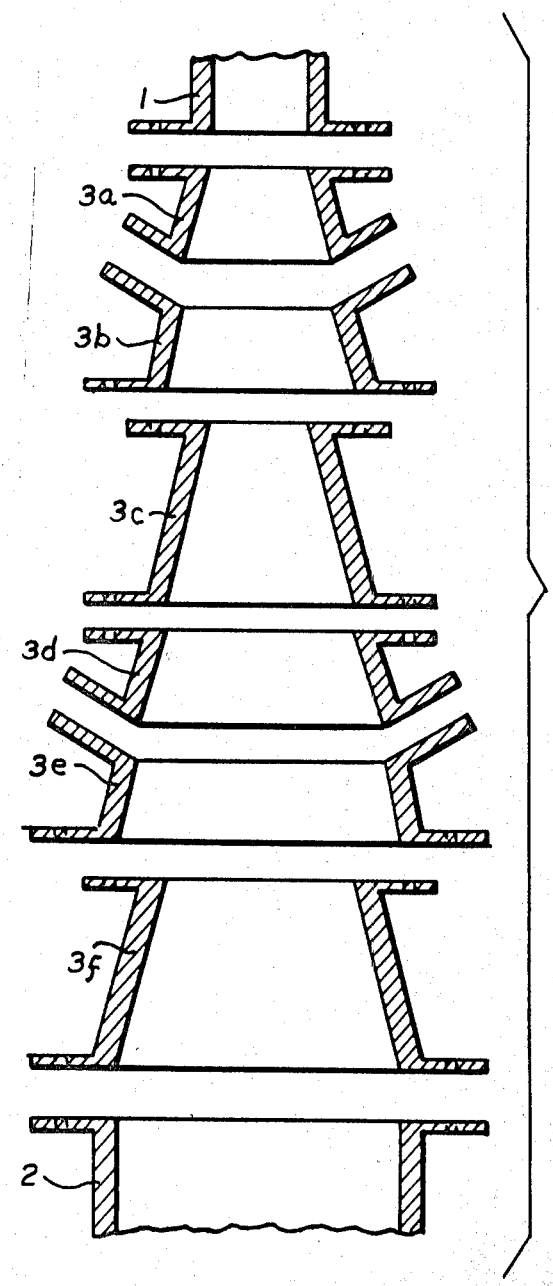

METHOD FOR OBTAINING TITANIUM DIOXIDE HAVING A CONTROLLED PARTICLE SIZE

BACKGROUND OF THE INVENTION

1. Field of the Invention

The present invention relates to a process for the production of titanium dioxide having pigmentary characteristics, by reaction in gaseous phase of titanium tetrachloride with an oxidizing gas such as oxygen or gases containing oxygen, according to the reaction:

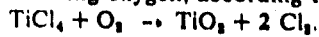

$TiCl_4 + O_2 \rightarrow TiO_2 + 2 Cl_2$.

2. Prior Art

This reaction is generally carried out at a temperature higher than 1000°C, preferably comprised between 1100° and 1500°C, by mixing the vaporized and pre-heated titanium tetrachloride with the oxidizing gas which had been pre-heated as well.

In case the titanium dioxide has to be utilized as pigment, the solid particles obtained by oxidation of titanium tetrachloride must have an average diameter not less than 0.18 μ. Generally the average diameter must be comprised between 0.18 and 0.26 μ; within that range one tries to obtain a product having a predetermined average diameter according to the use for which the pigment is intended. For instance, pigments having an average diameter comprised between 0.20 and 0.26 μ are preferred for enamels, while pigments having an average diameter ranging from 0.18 to 0.21 μ are preferred for plastic materials.

Moreover, it is necessary in either case that the distribution curve of the particle diameters be rather narrow around the value of the average diameter.

It is known that during the titanium tetrachloride oxidation it is possible to identify several transformation steps: a) the formation of solid nuclei of $TiO_2$ inside the gaseous phase (nucleation step); b) the growing of these nuclei by heterogeneous reaction of reagents on the surface of the solid particles; c) the agglomeration by anelastic type collision between two or more particles, thus forming particles of larger diameter.

It is also known that the average diameter and the distribution of the particles diameters depend on whether or not the nucleation step prevails over the growing steps; in the first case a greater number of small diameter particles (for instance, less than 0.1 μ) will be obtained, while, when the growing steps prevail over the nucleation step, a smaller number of particles of larger dimensions will be obtained. Therefore it is evident that, in order to obtain particles having an average diameter of not less than 0.18 μ, the oxidation reaction of $TiCl_4$ must be carried out so that the growing steps prevail over the nucleation step.

In order to achieve this end, some processes for the oxidation of $TiCl_4$ have been proposed in which a certain recycling of the reaction product towards the mixing zone of the reagents occurs; this recycling of solid particles produces a seeding of reagents in the mixing zone, that is it makes available therein $TiO_2$ seeds which grow, forming particles of large dimensions. For instance there has been proposed a process which utilizes a radial reactor (and namely a reactor in which a reagent stream is prevailingly axial and the stream of the other reagent is prevailingly radial) of the type schematically shown in axial section in FIG. 1.

This reactor is constituted by a cylindrical duct 1 joined at its bottom end to a cylindrical reaction chamber 2 through a frusto-conical downwardly divergent duct 3. According to this process, the oxidizing gas, preheated and endowed with a helical motion, is fed from the top through the upper cylindrical duct, while the vaporized and preheated titanium tetrachloride is fed through an annular slot 4 drawn in the higher cylindrical duct in correspondence with the smaller base of the frustum of the cone.

However, in this process the recycling of the products (shown in FIG. 1 by the small arrows) does not produce a sufficient seeding inasmuch as the recycling is limited to a small zone close to the downstream wall of the slot. Moreover, the recycling involves incompletely reacted products at rather low temperatures close to the mixing temperature. In order to achieve a more efficient recycling and therefore in order to obtain a product having better pigment characteristics, another process has been proposed which may be carried out by means of a radial reactor of the type schematically shown in axial section in FIG. 2, which reactor is the subject of U.S. Pat. application Ser. No. 72,561, filed by Giovanni Pieri et al on Aug. 17, 1970, now U.S. Pat. No. 3,725,526 granted on Apr. 3, 1973. This prior art reactor is constituted by a cylindrical duct 1 joined at its bottom end to a cylindrical chamber 2 through a frusto-conical duct 3.

According to this process the oxidizing gas, preheated and endowed with a helical motion, is fed from the top through the higher cylindrical duct, while the vaporized and preheated titanium tetrachloride is fed through an annular slot 4 drawn in the reaction chamber.

The hot oxidizing gas, entering the frusto-conical duct of the reactor, concentrates along the walls as a consequence of the centrifugal force due to the helical motion. At the same time, entering the frusto-conical duct, the fluid streams separate from one another in the zone close to the reaction axis. Consequently, the motion of the fluid inside the divergent duct is helical and downwardly directed close to the walls, and helical and upwardly directed in the central zone thereof. In such a way there is a large recycling of the solid products obtained downstream of the $TiCl_4$ feeding zone and also a concomitant drawing of $TiCl_4$ into a high-temperature, oxygen-rich zone upstream of the feeding zone of $TiCl_4$; in this zone the process of growth of the solid products is promoted at the expense of the formation of new nuclei, with the result that there are formed a relatively small number of $TiO_2$ particles having relatively large dimensions.

In the case of the process shown with reference to FIG. 1, in order to obtain particles of titanium dioxide having pigment dimensions, it is necessary to operate with reactors having very large dimensions and therefore with the known drawbacks of crust formation and obstructions. In the case of the process shown with reference to FIG. 2 there is no drawback. However, it is not possible any variation of the particle size (average diameter and distribution of the particles dimensions) within the pigmentary range with a reactor of this type once its capacity and dimensions are fixed. This limitation is also present in the process shown with reference to FIG. 1.

SUMMARY OF THE INVENTION

The present invention relates to a process for obtaining titanium dioxide having pigmentary characteristics, in the form of particles having a pre-fixed particle size, by oxidation of titanium tetrachloride vaporized and generally preheated to 400°–600°C, in a reactor essentially constituted by a cylindrical duct joined at its bottom end, through a downwardly divergent duct, preferably frusto-conical, to a cylindrical reaction chamber having a diameter D, by feeding thorugh the higher cylindrical duct the oxidizing gas, preheated to 1700°–2300° and endowed with a helical motion with a swirl number comprised between 0.2 and 20. The process is characterized in that the titanium tetrachloride is fed through an annular slot having a diameter D' drawn in the frusto-conical duct of the reactor, located so that the ratio D'/D is less than 1 and greater than or equal to 0.20.

All other conditions being equal, the average diameter and the variation coefficient of the particles obtained by this process depend on the value of the ratio D'/D. More exactly, such variations may be obtained by conferring to said ratio growing values in the range from 0.20 to less than 1.

BRIEF DESCRIPTION OF THE DRAWINGS

FIG. 3 is a longitudinal sectional view of a reactor for making titanium dioxide according to the present invention;

FIG. 4 is a longitudinal sectional view of a particular reactor for making titanium dioxide according to the present invention;

DESCRIPTION OF THE PREFERRED EMBODIMENTS

Figure 1:
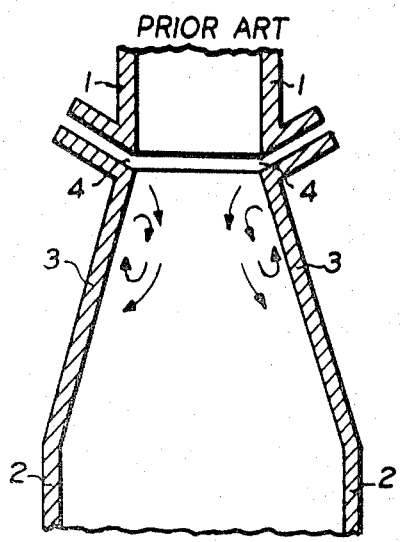
FIG. 1 and FIG. 2 are longitudinal sectional views of prior art reactors for making pigment grade titanium dioxide.
Figure 2:
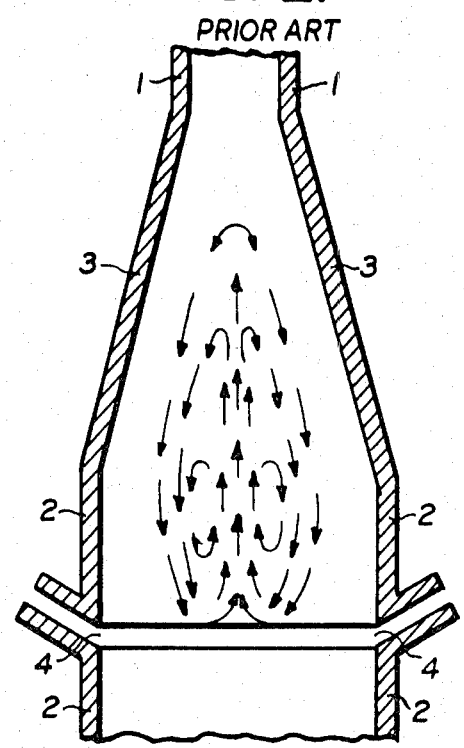

The process of the present invention may be carried out with a reactor of the type schematically presented in axial section in FIG. 3, and namely with a reactor comprising a cylindrical duct 1 having an internal diameter d joined at its lower end to a cylindrical reaction chamber 2 having an internal diameter D greater than d, through a downwardly divergent duct 3, preferably having a frusto-conical shape, wherein an annular slot 4 having a diameter D' is drawn.

The diameter D' of the annular slot 4 has a value such as the ratio D'/D is less than 1 and not less than about 0.20. In other words there two limit-positions in which the slot can be found according to the present invention:

a. a lower position which is almost coincident with the greater base of the frustum of cone 3; and b. a higher position (in which the ratio D'/D is equal to 0.20) near to the smaller base of the frustum of cone 3.

The slot may be located on the frusto-conical wall of the reactor, in one of the two above-mentioned limit-positions or in any intermediate position. The choice of the slot position is made depending on the average diameter of the pigment which has to be produced: The larger the D'/D ratio the larger average diameter of the pigment. The angle $\beta$, between the wall of the frusto-conical duct 3 and the axis of the reactor (that is the semi-angle of the cone inlet to which the frustum of cone ideally belongs) is comprised between about 5° and 30°.

The height of the frusto-conical duct may range from 0.5 to 10 times the diameter D of the cylindrical reaction chamber 2. The internal walls 5 and 6 of the slot form with the perpendicular to the reactor axis an angle $\alpha$ comprised between about 0° and 45°. The thickness of the slot, and namely the distance between the internal walls 5 and 6 is between .01 and .1, and preferably between .01 and .06, the diameter D of the reaction chamber.

The oxidizing gas is constituted by oxygen (or by a gas containing oxygen such as air) which is used in excess with respect to $TiCl_4$. Preferably there are used from 1.05 to 1.6 moles of $O_2$ per 1 mole of $TiCl_4$.

The oxidizing gas is generally preheated to the temperature of 1700°–2300°C with any method known in the technique, for instance by direct heating with an auxiliary flame obtained by burning a mixture of CO and $O_2$. The oxidizing gas is fed to the reactor through a swirler 7 into the higher cylindrical duct 1 with a helical motion characterized by a swirl number comprised between 0.2 and 20.

The swirl number of a gas flowing in a duct (see for instance the article of J. Chedaille, W. Leuckel, A. X. Chesters "Aerodynamic studies carried out on turbulent jets by the International Flame Research Foundation" in the Journal of the Institute of Fuel, 39 (1966) 506 – 521) is defined as follows:

$$S = 2.G/d.G_a$$

where the symbols have the following meanings:

S = swirl number

G = axial flux of moment of momentum with respect to axis of the duct through the section of the duct $G_a$ = axial flux of axial momentum through the section of the duct;

d = diameter of the duct through which the gas flows.

The axial flux G represents the product of a flow rate times linear speed times the axial length and may be expressed in $Kg.m^2.sec.^{-2}$; the outlet flux $G_a$ is a product of flow rate times speed and may be expressed in $Kg.m.sec.^{-2}$; diameter d may be expressed in meters.

Therefore number S is a dimensionless number which does not vary with the adopted system of units. When the gas has a swirl number equal to zero, one will have a pure linear motion along the direction of the duct axis, while with a swirl number equal to infinity, one will have a pure rotational motion (that is without an axial component). For intermediate values of the swirl number ranging between these two limits, one will have both rotational and linear motion along the direction of the duct axis, that is a helical motion.

Devices suitable for giving the gases a helical motion (devices hereinbelow referred to as "swirlers") are well known in the technique; for instance:

1 - the gas is fed tangentially into a cylinderical chamber (as occurs in cyclones);

2 - the gas is let to flow through blades which form a certain angle with the axis of the duct (such as blades of a Kaplan turbine);

3 - the gas is let to flow through canals which form an angle with the axis of the duct (such as helical gearing type);

4 - the gas is let to flow through a duct containing a helical vane.

The titanium tetrachloride, vaporized and preheated with any one of the known methods, up to a temperature generally comprised between 400° and 600°C, is fed to the reactor through the annular slot; the ratio between the momentum of TiCl$_4$ and the momentum of the oxidizing gas in the higher cylindrical duct is usually comprised between 0.05 and 1.75.

Generally a rutilizing agent, such as for instance AlCl$_3$ or TiCl$_3$, is added to TiCl$_4$ in amounts of 0.1 to 2% by weight with respect to TiCl$_4$.

The residence time of the reagents in the reactor may vary from 30 milliseconds to 1 second.

Inside the reactor, downstream of the higher cylindrical duct 1, the motion of the gases and of the solid particles drawn by them is helical and downwardly directed close to the walls, and helical and upwardly directed in the central zone. Such a situation involves both the frusto-conical zone upstream of the slot and the zone downstream of the slot up to a distance from the slot ranging from 1 to 3 times the diameter of the slot itself. At greater distances, the motion becomes exclusively helical and downard-directed.

The titanium dioxide obtained by means of the process according to the present invention is endowed with excellent pigmentary characteristics, is substantially all made up of rutile and has a narrow distribution of the particles dimensions. The average particles diameter is generally comprised between 0.18 and 0.26 microns, the percent coefficient of variation ranging between 25 and 35%.

As a measure of the average particles diameter, the "arithmetic mean" $\overline{d}_{10}$ has been adopted, which is defined as follows:

$$\overline{d}_{10} = 1/n \, \Sigma \, d_i f_i$$

wherein: $n$ is the total number of particles measured (in our experimental data, $n=2000$), $d_i$ is the diameter of a given particle, $f_i$ is the frequency, i.e., the number of particles having diameters $d_i$. This arithmetic mean is defined, for instance, in "Particle size - Theory and Industrial Applications" by Richard D. Cadle, Reinhold Pub. Co., New York, 1965.

As a measure of the particle size distribution the "percent number coefficient of variation" has been adopted. By "percent number coefficient of variation" we mean the following percent ratio:

$$V = \frac{s}{\overline{d}_{10}} \times 100$$

wherein:

s is the standard deviation of a distribution, equal to the square root of the variance (the variance of a distribution is equal to the mean of the square of the deviations from the mean). As is known, the standard deviation is a measure of the average spread of the distribution.

$\overline{d}_{10}$ is the above-mentioned arithmetic mean.

This "percent number coefficient of variation" is defined for instance in "statistical Methods in research and production with special reference to the chemical industry" by Owen L. Davies, Oliver and Boyd, London 1963.

The pigment obtained in accordance with the present invention shows furthermore an excellent "tinting strength". The values of tinting strength were determined with the New Jersey Zinc method described in a book by H. A. Gardner and G. G. Sward - "Paints, varnishes, lacquers and colors" — Gardner Lab., Bethesda, Maryland, USA — (page 52 of the 12th Edition, March 1962). The Regular Tinting Strength (RTS) is determined on 1 g of tested TiO$_2$. 1 g of TiO$_2$ is mixed with 0.82 g of castor oil and with a determined amount of black pigment (made up of 1 part of black powder and 7 parts of calcium carbonate); the homogenized sample is compared with a standard sample. The amount of black pigment used in order to obtain the equivalence between the tested sample and the standard sample gives the measure of the Tinting Strength. The test called Dilute Tinting Strength (DTS) is carried out in a similar manner starting however with a mixture of 0.15 g of TiO$_2$ and 0.85 g of CaCO$_3$. The difference between the Regular Tinting Strength and the Dilute Tinting Strength and the tone of the grey mixture give information on the pigment particle size. The process object of the present invention is particularly advantageous inasmuch as it allows the production of a pigment in the form of particles having the desired particle size, without varying either the reagents flows or the dimentions of the adopted reactor. in an industrial plant the above-mentioned purpose may be easily attained, thanks to a first form of embodiment of the present invention, by using a single reactor of the type shown by an example in FIG. 4, which is constituted by a given number of parts (in FIG. 4: 1, 3a, 3b, 3c, 3d, 3e, 3f and 2) which may be disassembled or reassembled in a different position in such a way to displace the position of the annular slot without varying all the other reactor dimensions.

A further form of embodiment of the present invention allows the utilization of a single reactor of the described type, in the frusto-conical duct of which two or more annular slots are drawn, preferably from 2 to 5, each of which being characterized by a different ratio D'/D. Such an embodiment is illustrated in FIG. 5.

Figure 5:
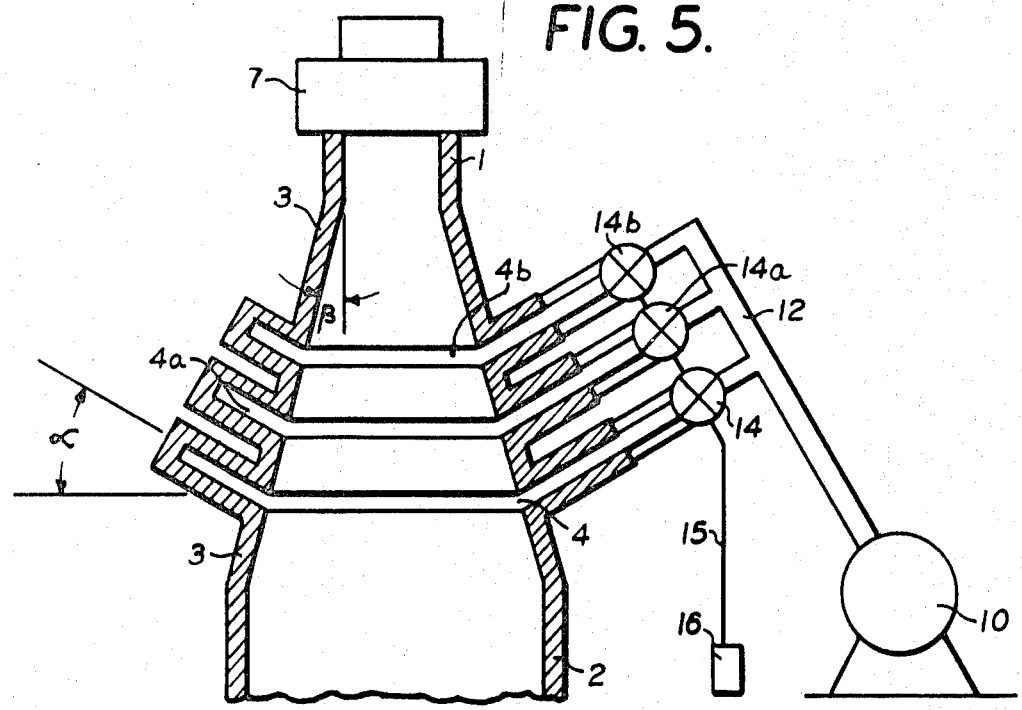
FIG. 5 is a longitudinal sectional view partly schematic of another embodiment of the present invention.

Referring now to FIG. 5 in detail, the frusto-conical section 3 of the reactor of the FIG. 5 embodiment is provided with three slots 4, 4a and 4b which are progressively higher in the section 3 and thus have progressively smaller D'/D ratios to thereby provide means for producing rutile TiO$_2$ of different mean particle size within the single reactor. Preferably, the supply of titanium tetrachloride from a source 10 is conveyed through a supply pipe 12 to three valves 14, 14a and 14b that respectively control the supply of TiCl$_4$ to slots 4, 4a and 4b by opening one of the valves 14, 14a and 14b while keeping the other two closed. The particular situs of introduction of TiCl$_4$ into the reactor can thus be selected whereby to select the predetermined mean diameter of the resultant product. The operation of the valves may be manual. However, as illustrated in FIG. 5 the valves may be electromechanical and interlocked through a control wire 15 and may be controlled by a suitable valve controlling means 16. In all other respects, including relative dimensions, the reactor of FIG. 5 is the same as FIG. 3 or as FIG. 4.

Figure 6:
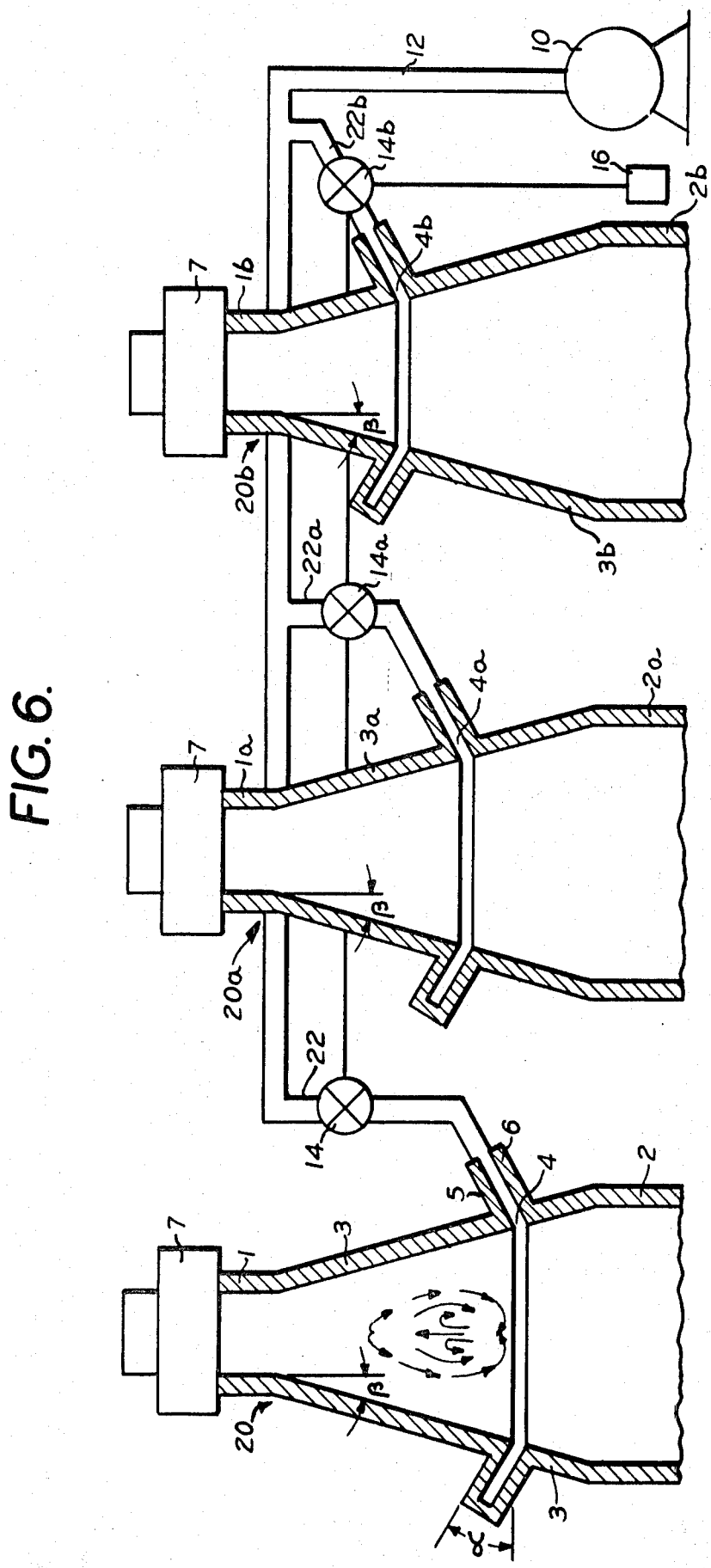
FIG. 6 is a sectional view of yet another embodiment of the present invention.

Still another embodiment of the invention is shown in FIG. 6 wherein three reactors 20, 20a and 20b are shown in side-by-side relation, each of them of the general configuration and construction of the reactor of FIG. 3 or of FIG. 4. However, reactor 20 has a slot 4 for introducing TiCl$_4$ into the frustoconical section 3 thereof that is close to cylindrical section 2 of the reactor 20; reactor 20a has a slot 4a for introducing TiCl$_4$ into the frusto-conical section 3a thereof approximately in the middle of said frusto-conical section; and reactor 20b is provided with a slot 4b adjacent the cylindrical inlet 1. Each of the slots is supplied with TiCl$_4$ from a source 10 through a manifold 12 having branches 22, 22a and 22b respectively controlled by valves 14, 14a and 14b. By opening a particular valve a selected reactor will be activated to produce rutile TiO$_2$ of a predetermined particle size dependent upon the location of the slot. Clearly in the FIG. 6 embodiment, TiO$_2$ of different particle sizes can be produced simultaneously in the three reactors 20, 20a and 20b; or in the alternative, in any two or one of them. The operation of the valves 14 will control the operation. For example, valves 14, 14a and 14b may be electromechanical and electrically interlocked and controlled by a central controller 16.

EXAMPLE 1

A reactor of the type shown in FIG. 3 is employed. Its characteristics are as follows: internal diameter d of the higher cylindrical duct: 35 mm; Angle $\beta$ : 10°; length of the reaction chamber: 1397 mm; internal diameter D of the reaction chamber: 150 mm.

An annular slot having a diameter D' of 67 mm (that is D'/D = 0.45), a thickness of 3 mm and an angle $\alpha$ of 30° have been drawn in the frusto-conical part duct of the reactor.

90.5 Nm$^3$/h of oxidizing gas, preheated to a temperature of about 2050°C are fed to the reactor through the higher cylindrical duct, with a swirl number of 0.80.

The oxidizing gas is obtained by combustion of CO with O$_2$ and contains about 62% by volume of oxygen.

390 Kg/h of TiCl$_4$, containing about 1% by weight of AlCl$_3$ as rutilizing agent, at a temperature of 447°C, are fed through the annular slot 4.

The speed of TiCl$_4$ in correspondence with the slot is 62 m/sec.; its momentum is about 25,600

$$\frac{kg}{h} \cdot \frac{m}{sec.}$$

The speed of the oxidizing gas in the higher cylindrical duct 1 is 520 m/sec.; its momentum is of about 32,000

$$\frac{kg}{h} \cdot \frac{m}{sec.}$$

The ratio between the momentum of TiCl$_4$ and that of the oxidizing gas is of about 0.80.

The residence time of the reagents in the reactor is of about 114 milliseconds.

The gas and the reaction products are quickly cooled when they leave the reactor to a temperature of 500°C, thereafter the titanium dioxide is separated from gaseous compounds in a well known manner. After 4 hours and 35 minutes, 606 kg of TiO$_2$, all rutile, in the form of particles having an average diameter of 0.20 $\mu$, are collected.

The percent number coefficient of variation is 29%; the value of Regular Tinting Strength is 1620 blue tone 4; the value of the Dilute Tinting Strength is 1710 blue tone 3.

EXAMPLE 2

A reactor of the type described in Example 1 is used. The only difference lies in that the annular slot has a diameter D' of 125 mm (that is D'/D = 0.83).

The speed of TiCl$_4$ in correspondence with the slot 33 m/sec.; its momentum is of about 13,700

$$\frac{kg}{h} \cdot \frac{m}{sec.}$$

the ratio between the momentum of TiCl$_4$ and that of the oxidizing gas is of about 0.43. By maintaining all the other conditions equal to those of Example 1, after 4 hours and 35 minutes, 590 Kg of titanium dioxide, all rutile, in the form of particles having an average diameter of 0.22 $\mu$, are collected.

The percent number coefficient of variation is 30%. The value of Regular Tinting Strength is 1650 blue tone 3; the value of Dilute Tinting Strength is 1740 blue tone 2.

EXAMPLE 3

A reactor like the one described in Example 1 is used. The only difference lies in that the annular slot has a diameter D' of 148 mm (that is D'/D = 0.98).

The speed of TiCl$_4$ in correspondence with the slot is 27.4 m/sec.; its momentum is of about 11,500

$$\frac{kg}{h} \cdot \frac{m}{sec.}$$

the ratio between the momentum of TiCl$_4$ and that of the oxidizing gas is of about 0.36. By maintaining all the other conditions described in Examples 1 and 2, after 5 hours and 30 minutes, 761 Kg of titanium dioxide, all rutile, in the form of particles having an average diameter of 0.24 $\mu$, are collected.

The percent number coefficient of variation is 35%; the value of Regular Tinting Strength is 1700 blue tone 1; the value of Dilute Tinting Strength is 1720 blue tone 1.

EXAMPLE 4

A reactor of the type shown in FIG. 3 is employed. It has the following characteristics: internal diameter d of the higher cylindrical duct : 25 mm ; angle $\beta$ : 11°; length of the reaction chamber : 1474 mm ; internal diameter D of the reaction chamber: 150 mm.

An annular slot having a diameter D' of 35 mm (that is D'/D = 0.23), a thickness of 2 mm and an angle $\alpha$ of 30° is drawn in the frusto-conical duct of the reactor. 33Nm$^3$/h of oxidizing gas, preheated to a temperature of about 1700°C, are fed to the reactor, with a swirl number of 0.85, through the higher cylindrical duct.

The oxidizing gas is obtained by combustion of CO with O$_2$ and contains about 71% by volume of oxygen.

170 Kg/h of TiCl$_4$, containing 1% by weight of AlCl$_3$ as rutilizing agent, at a temperature of 500°C, are fed through the annular slot. The velocity of TiCl$_4$ in correspondence with the slot is 63 m/sec., its momentum is of about 10,700

$$\frac{kg}{h} \cdot \frac{m}{sec.}$$

The velocity of the oxidizing gas in the higher cylindrical duct is 130 m/sec.; its momentum is about 6450

$$\frac{kg}{h} \cdot \frac{m}{sec.}$$

The ratio between the momentum of TiCl$_4$ and that of the oxidizing gas is of about 1.66.

The residence time of the reagents in the reactor is of about 276 milliseconds. is of The gases and the reaction products are quickly cooled when they leave the reactor to the temperature of 500°C, thereafter the titanium dioxide is separated from the gaseous compounds.

After 6 hours of 380 Kg of TiO$_2$, all rutile, endowed with excellent pigmentary characteristics, are collected. The average diameter of the particles is of 0.20 μ.

The percent number coefficient of variation is 35%; the value of Regular Tinting Strength is 1650 blue tone 1; the value of Dilute Tinting Strength is 1650 blue tone 1.

EXAMPLE 5

A reactor like the one described in Example 4 is used. The only difference lies in that the annular slot has a diameter D' of 100 mm (that is D'/D = 0.67).

The speed of TiCl$_4$ in correspondence with the slot is 22 m/sec.; its momentum is of about 3,800

$$\frac{kg}{h} \cdot \frac{m}{sec.}$$

the ratio between the momentum of TiCl$_4$ and that of the oxidizing gas is of about 0.59. All the other conditions being the same as those described in Example 4, after 178 hours, 11,400 Kg of titanium dioxide, all rutile, in the form of particles having an average diameter of 0.23μ, are collected.

The percent number coefficient of variation is 33%, the value of Regular Tinting Strength is 1630 blue tone 1; the value of Dilute Tinting Strength is 1670 blue tone 1.

Variations can, of course, be made without departing from the spirit and scope of the invention.

What is claimed is:

1. In a process for producing pigment quality titanium dioxide of controlled particle size by reacting gaseous titanium tetrachloride with an oxygen containing gas, the improvement comprising:
   a. preheating said oxygen containing gas to a temperature of about 1700°C to 2300°C and imparting to the preheated gas a helical motion characterized by a swirl number between about 0.2 and 20 and feeding said swirling gas to the top end of a reactor comprising an upper cylindrical duct, a lower cylindrical reaction chamber coaxial with said cylindrical duct and having a longer diameter than said cylindrical duct, and downwardly divergent frusto-conical duct connecting the lower end of said cylindrical duct to the upper end of said cylindrical reaction chamber, said frusto-conical duct diverging from the vertical at an angle of from about 5° to 30° and having a vertical extent of from about 0.5 to 10 times the diameter of said reaction chamber;
   b. selecting the vertical location for an annular slot in said frusto-conical duct at a location such that the ratio of the diameter of said annular slot to the diameter of said reaction chamber is less than 1.0 and not less than .2, said slot having a thickness of between about .01 and .1 times the diameter of the reaction chamber and being inclined to the reactor axis at an angle of between about 0° and 45°; and
   c. heating the titanium tetrachloride to about 400° to 600°C and feeding said titanium tetrachloride through said annular slot into said frusto-conical duct.

2. The improvement according to claim 1, wherein the ratio between the momentum of the titanium tetrachloride through the annular slot and the momentum of the oxidizing gas in the upper cylindrical duct is comprised between .05 and 1.75.

3. The improvement according to claim 1, wherein the titanium tetrachloride is fed through an annular slot having a thickness comprised between .01 and .06 times the diameter of the reaction chamber.

* * * * *